(12) United States Patent
Friedrich et al.

(10) Patent No.: US 11,324,569 B2
(45) Date of Patent: May 10, 2022

(54) DELIVERY SYSTEM FOR A DENTAL COMPOSITION

(71) Applicant: 3M INNOVATIVE PROPERTIES COMPANY, St. Paul, MN (US)

(72) Inventors: Anja Friedrich, Munich (DE); Christian Richter, Feldafing (DE)

(73) Assignee: 3M Innovative Properties Company, St. Paul, MN (US)

( * ) Notice: Subject to any disclaimer, the term of this patent is extended or adjusted under 35 U.S.C. 154(b) by 277 days.

(21) Appl. No.: 16/629,724

(22) PCT Filed: Jul. 10, 2018

(86) PCT No.: PCT/US2018/041387
§ 371 (c)(1),
(2) Date: Jan. 9, 2020

(87) PCT Pub. No.: WO2019/014176
PCT Pub. Date: Jan. 17, 2019

(65) Prior Publication Data
US 2021/0145543 A1 May 20, 2021

(30) Foreign Application Priority Data
Jul. 12, 2017 (EP) ..................................... 17180883

(51) Int. Cl.
*A61C 5/68* (2017.01)
*A61C 9/00* (2006.01)

(52) U.S. Cl.
CPC .............. *A61C 5/68* (2017.02); *A61C 9/0026* (2013.01)

(58) Field of Classification Search
CPC ........... A61C 5/68; A61C 5/64; A61C 9/0026; A61M 5/19; A61M 5/2066; A61M 5/2448; A61M 5/284; A61M 5/31596; A61M 5/3296; A61M 2039/0027; B65D 81/325; B01F 2215/0039; B05C 17/00566; B05B 7/1468; Y10T 137/85954
See application file for complete search history.

(56) References Cited

U.S. PATENT DOCUMENTS

2006/0227653 A1* 10/2006 Keller .................. B01F 13/002
366/139
2009/0127289 A1* 5/2009 Keller ............... B05C 17/00516
222/135
2016/0030671 A1 2/2016 Tennican

FOREIGN PATENT DOCUMENTS

DE       102009040705       3/2011
WO       WO 2012-038038     3/2012
WO       WO 2012-115022     8/2012

OTHER PUBLICATIONS

International Search report for PCT International Application No. PCT/US2018/041387 dated Oct. 23, 2018, 5 pages.

* cited by examiner

*Primary Examiner* — Heidi M Eide

(57) ABSTRACT

The present invention relates to a delivery system (100) for the release of a dental composition mixed from two or optionally three components. The delivery system has a mixer (14), a cartridge (20) with three compartments and a switchable bypass valve (40) for bypassing the third component from the mixer. The present application further relates to a method of dispensing a dental composition.

12 Claims, 4 Drawing Sheets

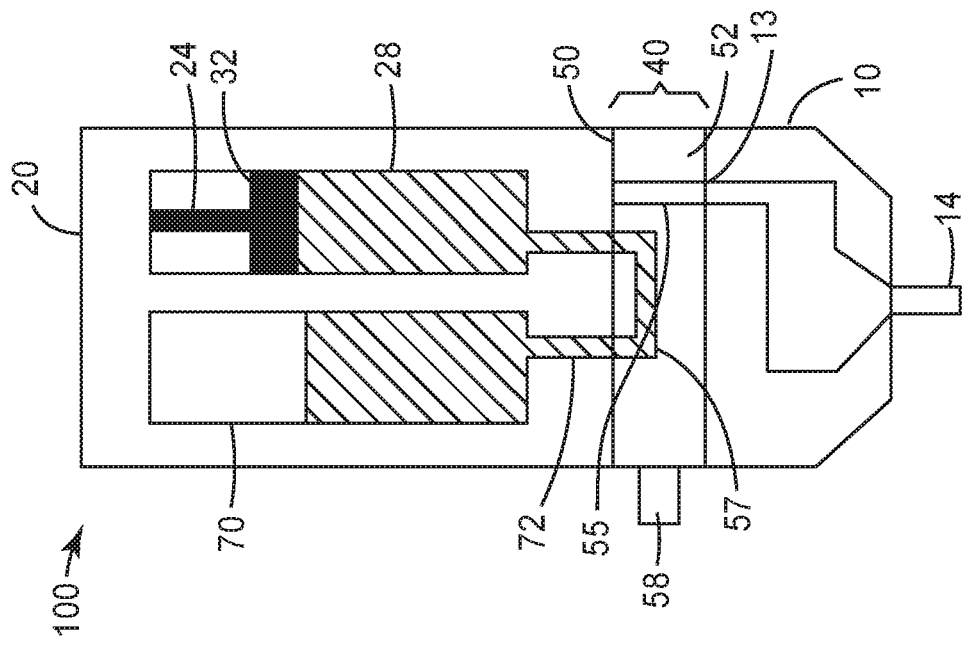
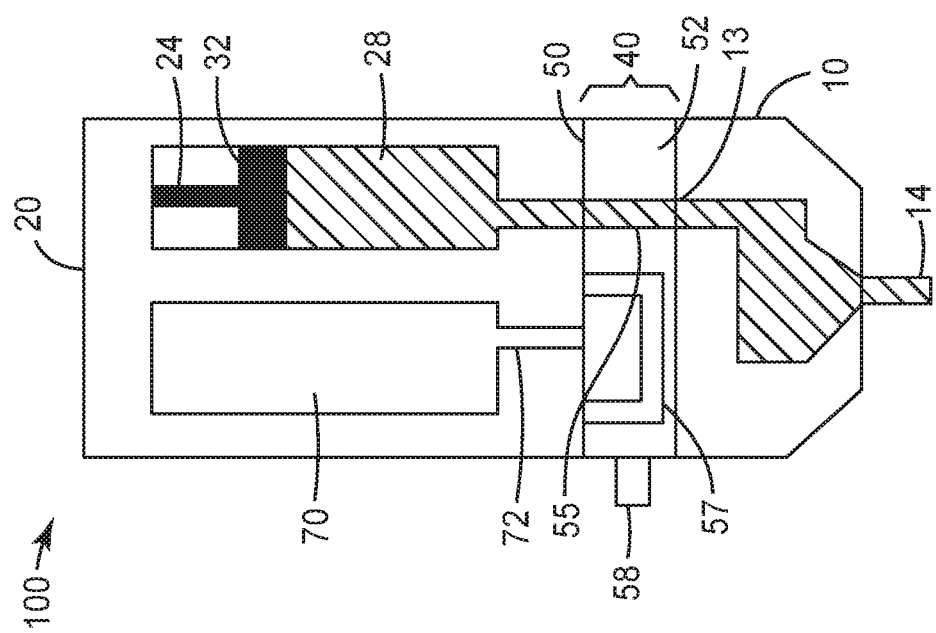
FIG. 1A
FIG. 1B

DELIVERY SYSTEM FOR A DENTAL COMPOSITION

TECHNICAL FIELD

The present invention relates to a delivery system for a dental composition comprising three components. In particular, the invention relates to a delivery system that has a mixer, a cartridge with three compartments and, as functional element, a switchable bypass valve for bypassing the third component from the mixer. The present invention further relates to a method of dispensing a dental composition.

BACKGROUND

Dental compositions for dental impressions or other procedures often are provided in packages storing two components for example, a base paste and a catalyst paste that chemically react when mixed together in order to form the usable dental composition.

The storage of dental compositions as separate components helps achieving a maximized shelf-life of the package for shipping to a user and storage for some time. Further, the storage of dental compositions as separate components enables a storage of rapidly hardening dental compositions over a relatively long time in that the chemically reactive parts of the composition are kept separate during storage and brought together by mixing shortly before use.

Typically, the components stored in a package are provided in a fixed proportion and must be mixed at a fixed mixing ratio. Although there may be a desire to use components of a dental composition at different proportions, for example to achieve different viscosities or hardening times, any arbitrary change of the mixing ratio by a user would likely affect the quality and performance of the resulting dental composition and is therefore typically not permitted and considered as misuse.

However there are packages which allow a controlled variation of mixing ratios for multi-component materials.

For example DE 10 2009 040 705 A1 discloses a device for dosing of components to be mixed that has at least three cartridges. The device stores a base component and two or more second components. The user can select between different second components that are to be mixed with the base component.

Although existing delivery systems provide certain advantages, there is still a need for a system that allows a user to control or alter the properties of the dental composition without affecting the quality of the dental composition.

SUMMARY

The invention relates to a delivery system for a dental composition. The delivery system comprises a mixer and a cartridge. The cartridge has a first, second and third compartment for receiving a first, second and third component, respectively, of the dental composition. The delivery system further comprises a bypass valve that is switchable between a first position and a second position. In the first position of the bypass valve, fluid communication is established between the third compartment and the mixer, and in the second position of the bypass valve, fluid communication is blocked between the third compartment and the mixer. The bypass valve further comprises a bypass outlet by (or via) which a reservoir is connectable (or connected) to the third compartment. In the second position of the bypass valve fluid communication is blocked between the third compartment and the bypass outlet. Further, in the first position of the bypass valve fluid communication is established between the third compartment and the bypass outlet.

In one embodiment, the cartridge is made of a polymeric material. The polymeric material may be selected from Polyethylene (PE), Polypropylene, Polyoxymethylene (POM) and Polyethylene Terephthalate (PET).

The invention is advantageous in that a user can select between mixing two or three components as desired. Accordingly, the material can be changed by the user, for example a dentist, between two different compositions, each having a controlled quality. The user can for example operate with two different application viscosities as required. Further, the invention is advantageous in that it allows the use of a standardized dispensing gun. Such a standardized dispensing gun is typically configured to, preferably simultaneously, urge all three components forward. The three components or only two components may thus selectively be mixed as desired. For example there is no need for a dispensing gun that allows for suspending the dispensation of one or more of the components while another or other components are dispensed. The delivery system according to the present invention provides for an optional delivery of a third component of a three component delivery system. The delivery of the third component can be prevented on demand, i. e. if the third component is not needed. With the delivery system, relatively inexpensive standard cartridges with three components can be used without constructional changes, even if the third component is not needed for the application. Furthermore, the delivery system provides for safe and reliable suppression of the delivery of the third component. For example, the third component may be stored in a reservoir, so that no waste material spoils the application site. Further, property adaptations of the dental composition provided by the delivery system are possible with the delivery system of the present invention. Such property adaptations comprises for example a change of the viscosity. A change of the viscosity may enabled in that one component is optionally fed to the mixer of the delivery system. Other changes, like a change of the color, translucency or the hardening time of the dental composition, are conceivable as well. Furthermore, if pistons are used to urge the components out of the compartments, additional constructional efforts for example to allow one or more of the pistons to be optionally used or disabled—can be avoided. If it is required that one of the components is not to be delivered, for example, decoupling of the piston from an advancement into the compartment is not necessary with the delivery system of the present invention. Typically the same motion or advancing speed for all pistons is required. The delivery system of the present invention allows for selectively adding a third component to two components in a three component delivery system, e. g. to achieve property changes of the delivered dental composition permanently or temporarily. In yet another embodiment, the mixer of the delivery system is a static mixer. In a further embodiment, the delivery system further comprises a gun into which the cartridge may be inserted.

The cartridge may comprise a piston in at least one, in two or in three of the compartments. Such pistons are preferably configured for emptying the compartments and for advancing the components towards the mixer. In this case, the gun may further comprise advancing means like for example plungers for engaging with the pistons of the compartments. The advancing means may be manually driven or motor-driven.

In a further embodiment, the compartments are pressurized compartments in order to advance the components towards the mixer, if the compartment outlet is opened. Pressurizing the compartments may be performed through internal pressure, for example with a gas cushion in the compartment, which advances the component of the compartment towards the mixer, if the outlet is opened. Pressurizing may also be performed through compartments which are compressible (for example foil bags), such that external pressure applied to the compressible compartment advances the component of the compartment towards the mixer, if the outlet is opened. It is also conceivable to arrange a piston in the at least one, in two or in three of the compartments, which is pressurized and which advances the component in the compartment towards the mixer, if the outlet is opened.

In a further embodiment, the mixer of the delivery system has three mixer inlets, each connectable to the respective first, second and third compartment in the first position of the bypass valve. The reservoir may be arranged inside the cartridge.

The reservoir may further be arranged externally, i. e. separate from or outside the cartridge. The reservoir may comprise fluid connection means to connect the reservoir to the bypass outlet to provide fluid communication between the reservoir and the component, for example by means of a thread connection, a bayonet connection, a snap-fit connection, a patch plug connection or any other suitable connection means. The reservoir may comprise (mechanical) attachment means to attach the reservoir at the cartridge, for example by mechanical fasteners such as a hook and loop fastener, a snap-fit fastener, an adhesive fastener or any other suitable attachment means.

In one embodiment, the bypass valve of the delivery system comprises a bypass slide. The bypass valve may be formed by the bypass slide in combination with the cartridge and/or a portion of the mixer. The bypass slide may be positioned between the cartridge and the mixer, for example such that the bypass slide is enclosed by a portion of the cartridge and/or a portion of the mixer.

In another embodiment, the bypass valve of the delivery system is formed by a bypass slide and a bypass valve housing. A connection means may be provided to connect the bypass valve to the cartridge and the mixer, respectively. The connection means may comprise a thread connection or may form a bayonet connection or any other appropriate solution. The bypass valve may be connected to the mixer by the thread or the bayonet such that the thread or the bayonet (of the bypass valve) engages with the respective portion at the mixer and the cartridge, respectively.

In yet another embodiment, the bypass valve is at least partially integral with the cartridge, for example the cartridge may provide the bypass housing and form together with the bypass slide the bypass valve. The bypass valve may also be a separate part, for example with a bypass housing and a bypass slide. In this case the bypass valve is connectable to the cartridge, for example by means of a thread connection, bayonet connection or any other suitable connection means.

In one embodiment, the bypass valve is a rotary valve. In this rotary slide valve the bypass slide may be arranged as a rotary slide such that the bypass valve rotates or can be rotated from the first to the second position. The rotary slide may be rotated from the first to the second position for an angle of about 180 degrees, preferably of about 90 degrees.

In another embodiment, the bypass valve is a slide valve, for example a linear slide valve. In this slide valve the bypass slide may be arranged for linear or lateral movement from the first to the second position.

In another embodiment, the bypass slide of the bypass valve of the delivery system may have three through-holes, namely a first, second and third through-hole. The three through holes may be arranged such that fluid communication between each of the first and second compartment to the mixer is established in the first and second position of the bypass valve. Further the three through holes may be arranged such that fluid communication between the third compartment and the mixer is established in a first position of the bypass valve and fluid communication between the third compartment and the mixer is blocked in a second position of the bypass valve. Typically, the shape of the through-holes is in accordance to the path at which the bypass slide moves or is movable. For example, the through-holes may have an arcuate shape, if the valve is a rotary valve. The through-holes may have a straight shape, if the valve is a slide valve or linear slide valve. A combination of a rotary valve and a slide valve is also conceivable with a respective shape of the holes.

In one embodiment, the third through-hole of the delivery system may overlap with the outlet of the third compartment in the first position of the bypass valve.

In yet another embodiment, the bypass slide of the valve of the delivery system may have a hole of sufficient size to allow for fluid communication between the third compartment and the bypass outlet port in the second position of the bypass valve.

The bypass slide may have a blind-hole that forms an opening that is arranged and sized to span the outlet of the third compartment and the bypass outlet.

Typically, the shape of the blind-hole may be in accordance to the path at which the bypass slide moves. For example, the blind-hole may be formed as an oblong hole such that it is arranged and positioned to allow for fluid communication between the third compartment and the bypass outlet port in the second position of the bypass valve. The blind-hole may have an arcuate shape, if the bypass valve is a rotary valve. The blind-hole may have a straight shape, if the bypass valve is a slide valve or linear slide valve. A combination of a rotary valve and a slide valve is also conceivable with a respective shape of the holes.

In a further embodiment, the blind-hole overlaps with the outlet of the third compartment and the bypass outlet in the second position of the bypass valve such that fluid communication is established between the third compartment and the bypass outlet.

In yet a further embodiment, the delivery system further comprises a first, second and third nozzle to connect each the first, second and third compartment to the respective first, second and third mixer inlet. The nozzles may be an integral part with the cartridges. The nozzles may also be a separate part. The nozzles may comprise connection means, for example a thread connection or a bayonet connection, for connecting the nozzles to the compartments.

In one embodiment, the first and second through-hole of the delivery system are formed as oblong holes. Therefore the nozzles each reach through each of the first and second through-holes. Typically, the shape of the oblong-holes may be in accordance to the path at which the bypass slide moves. For example, the oblong holes may have an arcuate shape, if the bypass valve is a rotary valve. The oblong hole may have a straight shape, if the bypass valve is a slide valve. The oblong size may extend partially circumferentially in a plane that is transverse to a/the rotation axis of the bypass slide. A combination of a rotary valve and a slide valve is also conceivable with a respective shape of the holes.

In another embodiment, the delivery system further comprises a handle. The handle may be arranged at the bypass slide of the bypass valve for operating the bypass valve between the first and second position.

The bypass valve may be switched between the first and second position by actuating the handle. The handle may be an integral part with the bypass slide of the bypass valve. The handle may be made of the same material as the bypass valve. The handle may be a separate part. The handle may be made of a material different to the valve material. The handle may comprise a connection means, for example a thread, which may engage with a respective thread at the valve. The thread of the handle may be an external thread corresponding with an internal thread at the bypass valve.

The present application further relates to a method of dispensing a dental composition, comprising the steps of:

providing a first, second and third component of a dental composition, providing a delivery system comprising a mixer, a cartridge having a first, second and third compartment for receiving a first, second and third component, respectively, of the dental composition; and a bypass valve switchable between a first position and a second position, wherein in the first position, fluid communication is established between the third compartment and the mixer, and a bypass outlet and optionally a reservoir, and wherein in the second position, fluid communication is blocked between the third compartment and the mixer, the method further comprising the step of:

switching the bypass valve to the second position, and urging the first and second component from the respective first and second compartment into the mixer and thereby causing the first and second component to be mixed within the mixer, and urging the third component from the third compartment to the bypass outlet, and thereby optionally storing the third component in the reservoir.

In one embodiment the method further comprises the step of switching the bypass valve to the first position, and urging the first, second and third component from the respective first, second and third compartment into the mixer and thereby causing the first, second and third component to be mixed within the mixer.

SHORT DESCRIPTION OF DRAWINGS

FIG. 1a shows in a cross-sectional view a first embodiment of the delivery system of the present application with part of the cartridge, the bypass valve and the mixer. Fluid communication is established between the third compartment and the mixer via the bypass valve in a first position.

FIG. 1b shows the embodiment of the delivery system as shown in FIG. 1a. Fluid communication is blocked between the third compartment and the mixer. Fluid communication is established between the third compartment and the reservoir via the bypass valve in a second position.

FIG. 2a shows in a cross-sectional a second embodiment of the delivery system of the present application. Fluid communication is established between the third compartment and the mixer via the bypass valve in a first position.

FIG. 2b shows the embodiment of the delivery system as shown in FIG. 2a. Fluid communication is blocked between the third compartment and the mixer. Moreover, an external reservoir is shown, which is in fluid communication with the third compartment via the bypass valve in a second position.

DETAILED DESCRIPTION OF DRAWINGS

Figure 2A:
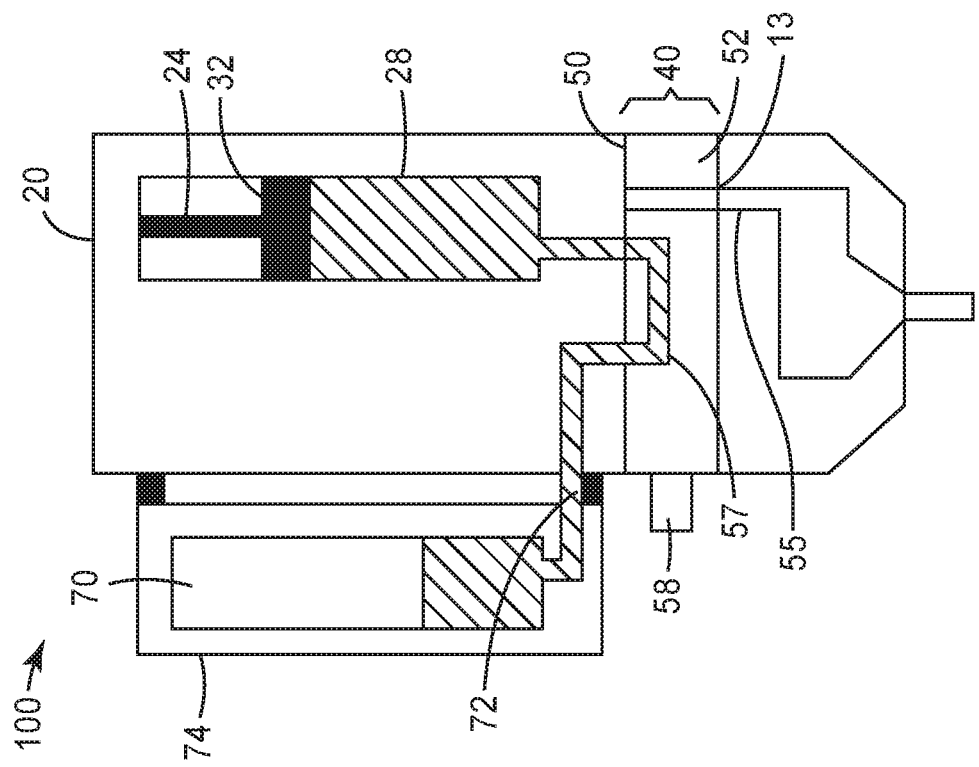

FIG. 1a shows in a cross-sectional view a first embodiment of the delivery system 100 of the present invention, in which a cartridge 20 is shown comprising a third compartment 28 with a piston 32 having a plunger 24 and a reservoir 70 for receiving the component from the third compartment. The reservoir 70 is arranged internally in the cartridge 20 and has a reservoir entry 72. Furthermore, the bypass valve 40 with the bypass valve housing 50 and the bypass slide 52 as well as the mixer 10 are shown.

The bypass valve 40 is in a first position such that fluid communication is established between the third compartment 28 and the mixer 10 via the third through-hole 55 of the bypass slide 52 of the bypass valve 40 and the third mixer inlet 13. In the first position of the bypass valve 40, the third compartment 28 is not in fluid communication to the reservoir 70 and the reservoir entry 72, respectively.

Moreover, mixer outlet 14 is shown at the opposite side of the mixer 10, relative to the mixer inlet 13 of the mixer 10. A handle 58 is shown for switching the bypass valve 40 between the first and second position. The handle 58 thereby rotates the bypass slide 52 of the bypass valve 40 such that the third through-hole 55 is in fluid communication to the third compartment 28 on the one hand and to the mixer inlet 13 on the other hand in a first position.

FIG. 1b shows the embodiment of FIG. 1a, whereby the bypass valve 40 is in a second position such that fluid communication is blocked between the third compartment 28 and the mixer 10. In the second position of the bypass valve 40, fluid communication is established between the third compartment 28 and the reservoir 70 via the oblong blind-hole 57 of the bypass slide 52 of the bypass valve 40 and the reservoir entry 72.

The handle 58 is shown in FIG. 1b as well, whereby the handle 58 was operated to switch the bypass valve 40 to a second position in which the third through-hole 55 of the bypass slide 52 of the bypass valve 40 is not in fluid communication with the third compartment 28. Instead, the oblong blind-hole 57 of the bypass slide 52 of the bypass valve 40 is in fluid communication with the third compartment 28 on the one hand and with the reservoir 70 via the reservoir entry 72 on the other hand, such that fluid communication is established between the third compartment 28 and the reservoir 70.

FIG. 2a shows in a cross-sectional view a second embodiment of the delivery system 100 of the present application. The difference to the embodiment as shown in FIGS. 1a and 1b is that the reservoir 70 is arranged externally (i. e. not shown in FIG. 2a, please see FIG. 2b). The bypass valve 40 is in a first position, such that fluid communication is established between the third compartment 28 and the mixer 10 via the third through-hole 55 of the bypass slide 52 of the bypass valve 40 and the third mixer inlet 13.

Figure 2B:
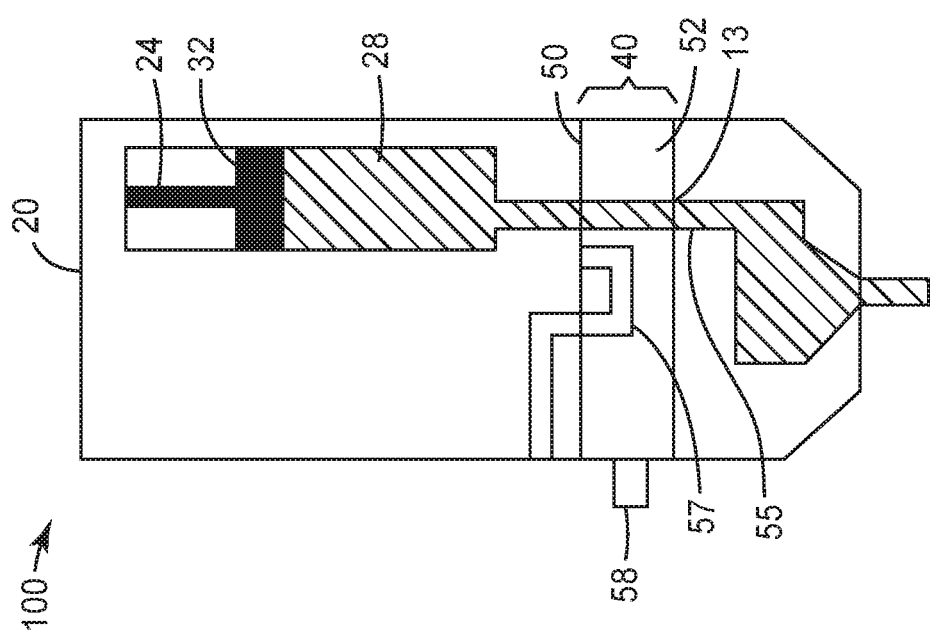

FIG. 2b shows the embodiment of FIG. 2a, whereby the bypass valve 40 is in a second position such that fluid communication is blocked between the third compartment 28 and the mixer 10. Furthermore, an external reservoir 70 for receiving the component from the third compartment 28 is shown. The external reservoir 70 is in fluid communication with the third compartment 28 via the oblong blind-hole 57 of the bypass slide 52 of the bypass valve 40 and the reservoir entry 72.

Figure 3A:
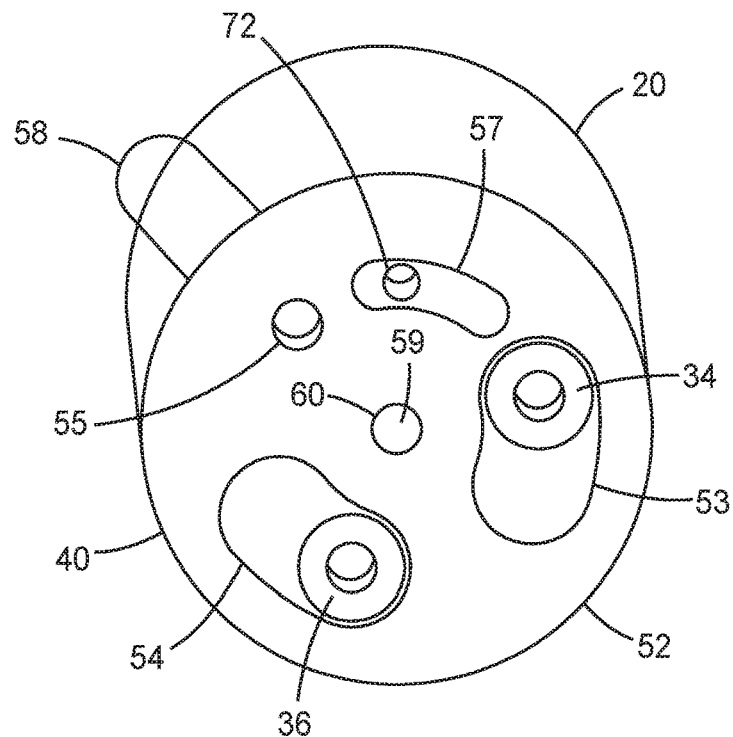
FIG. 3a shows in a cross-sectional perspective view an embodiment of the bypass valve of the delivery system in a first position.

FIG. 3a shows in a cross-sectional perspective view an embodiment of the bypass valve 40 of the delivery system 100. The bypass valve 40 with the bypass slide 52 is shown, whereby the bypass slide 52 has holes 53, 54, 55, 57 therein. Holes 53 and 54 are formed as oblong holes such that nozzles 34 and 36 can reach through the holes 53 and 54 when the bypass valve 40 is in the first or the second position including the switching operation from the first to the second position.

Furthermore, a part of the cartridge 20 of the delivery system 100 is shown. The bypass valve 40 is connected to the part of the cartridge 20 such that the nozzles 34 and 36 reach through the oblong holes 53 and 54 such that the nozzles 34 and 36 are in fluid communication with mixer inlets 11 and 12 (not shown) of mixer 10. The bypass valve 40 is in a first position such that fluid communication between the third compartment 28 (not shown) and the mixer 10 (not shown) is established. The third through-hole 55 establishes fluid communication to the third compartment 28 (not shown) on the one hand and to the mixer inlet 13 of the mixer 10 (not shown) on the other hand.

Moreover, the cartridge 20 further has a slide axis 59, which provides for rotational movement of the bypass slide 52 by rotationally engaging with the receptacle 60 of the bypass slide 52.

Figure 3B:
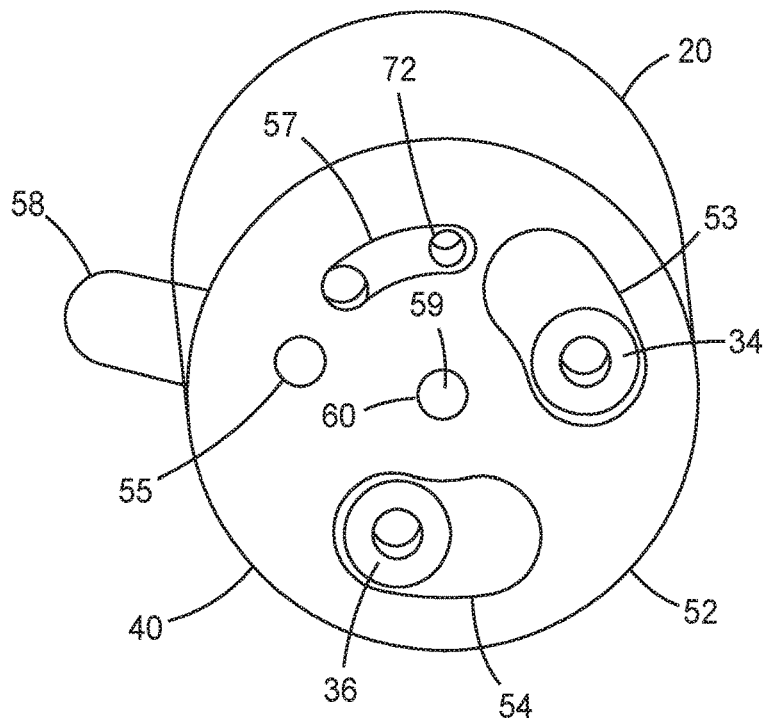
FIG. 3b shows in a cross-sectional perspective the embodiment of FIG. 3a in a second position.

FIG. 3b shows in a cross-sectional perspective view the embodiment of FIG. 3a, whereby the bypass valve 40 is in a second position such that fluid communication between the third compartment 28 (not shown) and the mixer 10 (not shown) is blocked. The handle 58 had been operated to switch the bypass valve 40 to a second position. In this second position, fluid communication is established between the third compartment 28 (not shown) and the reservoir 70 (not shown) via the oblong blind-hole 57. Furthermore, in the second position of the bypass valve 40, the holes 53 and 54 allow due to their oblong shape that nozzles 34 and 36 can reach through the holes 53 and 54 such that the nozzles 34 and 36 are in fluid communication with mixer inlets 11 and 12 (not shown) of mixer 10.

The slide axis 59 of the cartridge 20 is shown engaging rotationally with receptacle 60 of the bypass slide 52.

Figure 4:
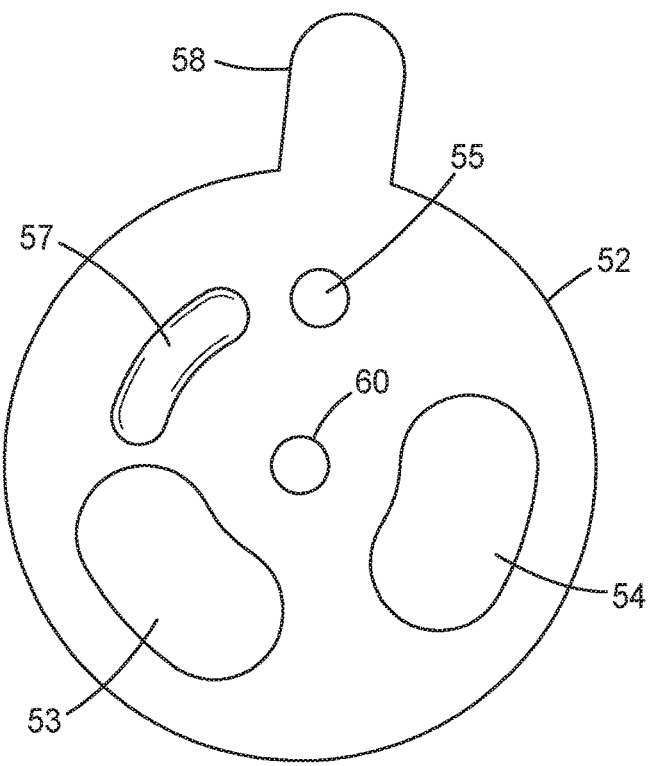
FIG. 4 shows in a top view the bypass slide of the valve of the bypass valve of the embodiments shown in FIGS. 3a and 3b.

FIG. 4 shows in a top view the bypass slide 52 of the bypass valve 40 of the embodiments shown in FIGS. 3a and 3b having through-holes 53, 54, 55, an oblong blind-hole 57 and a receptacle 60 for the slide axis 59 (not shown) of the cartridge 20 (not shown). Through-holes 53 and 54 are formed as oblong holes.

Figure 5:
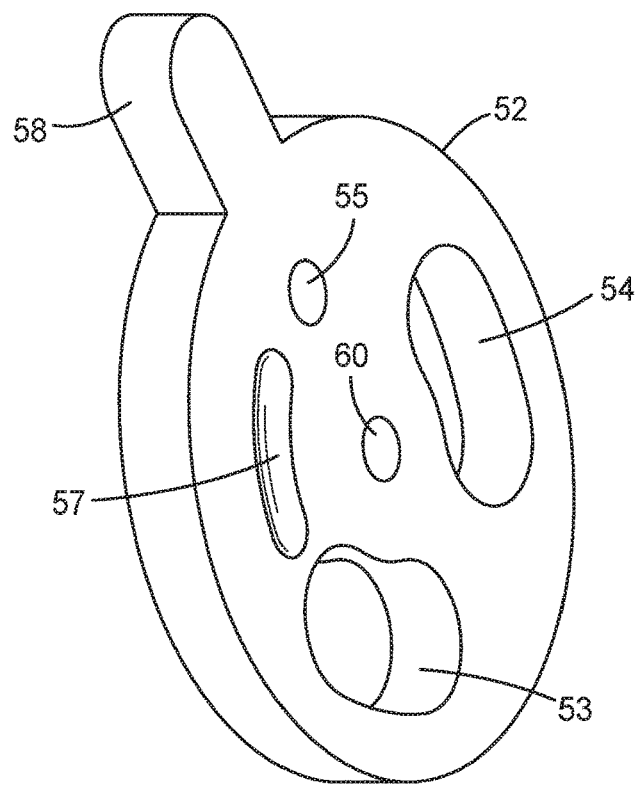
FIG. 5 shows in a perspective view the bypass slide as shown in FIG. 4.

FIG. 5 shows in a perspective view the bypass slide as shown in FIG. 4. In this view, it is apparent that holes 53 and 54 are formed as through-holes, whereby oblong blind-hole 57 is not a through-hole, but a blind-hole. Furthermore, handle 58 is shown as well as receptacle 60 for rotationally engaging with slide axis 59 (not shown) of the cartridge 20 (not shown).

What is claimed is:

1. A delivery system for a dental composition comprising:
a mixer,
a cartridge having a first, second and third compartment for receiving a first, second and third component, respectively, of the dental composition; and
a bypass valve switchable between a first position and a second position;
  wherein in the first position, fluid communication is established between the third compartment and the mixer, and
  wherein in the second position, fluid communication is blocked between the third compartment and the mixer;
wherein the bypass valve further comprises a bypass outlet by which a reservoir is connectable to the third compartment;
wherein fluid communication is blocked between the third compartment and the bypass outlet in the first position of the bypass valve, and wherein fluid communication is established between the third compartment and the bypass outlet in the second position of the bypass valve;
wherein the bypass valve further comprises a bypass slide, the bypass valve being formed by the bypass slide in combination with the cartridge and/or a portion of the mixer; and
wherein the bypass slide has three through-holes, the three through-holes being arranged such that fluid communication between each the first and second compartment to the mixer is established in the first and second position of the bypass valve and such that fluid communication between the third compartment to the mixer is established in the first position of the bypass valve and blocked in the second position of the bypass valve.

2. The delivery system of claim 1, wherein the third through-hole overlaps with an outlet of the third compartment in the first position of the bypass valve.

3. The delivery system of claim 1, wherein the bypass slide has a blind-hole of sufficient size to allow for fluid communication between the outlet of the third compartment and the bypass outlet in the second position of the bypass valve.

4. The delivery system of claim 3, wherein the blind-hole overlaps with the outlet of the third compartment and the bypass outlet in the second position of the bypass valve such that fluid communication is established between the third compartment and the bypass outlet.

5. The delivery system of claim 1, wherein the mixer has a first, second and third mixer inlet which each are connected to the respective first, second and third compartment in the first position of the bypass valve.

6. The delivery system of claim 1, wherein the bypass slide of the bypass valve is rotatably attached to the cartridge and/or the mixer.

7. The delivery system of claim 1, wherein the first, second and third compartment further comprises a first, second and third nozzle to connect each the first, second and third compartment to the respective first, second and third mixer inlet.

8. The delivery system of claim 7, wherein the first and second through-holes are formed as oblong holes such that the nozzles of the first and second compartment each reach through each of the first and second through-hole, respectively.

9. The delivery system of claim 1, wherein a handle is arranged at the bypass slide for operating the bypass valve between the first and the second position wherein the bypass valve is switched between the first and second position by actuating the handle.

10. A method of dispensing a dental composition, comprising:
providing a delivery system comprising:
a first, second and third component of a dental composition,
a mixer,
a cartridge having a first, second and third compartment for receiving the first, second and third component, respectively, of the dental composition, and
a bypass valve switchable between a first position and a second position,
wherein the bypass valve further comprises a bypass outlet,
wherein in the first position, fluid communication is established between the third compartment and the mixer, and
wherein in the second position, fluid communication is blocked between the third compartment and the mixer,
switching the bypass valve to the second position, and urging the first and second component from the respective first and second compartment into the mixer and thereby causing the first and second component to be mixed within the mixer, and urging the third component from the third compartment to the bypass outlet.

11. The method of claim 10, further comprising:
switching the bypass valve to the first position, and urging the first, second and third component from the respective first, second and third compartment into the mixer and thereby causing the first, second and third component to be mixed within the mixer.

12. The method of claim 10, wherein the cartridge further comprises a reservoir.

\* \* \* \* \*